(12) United States Patent
Roy (10) Patent No.: US 9,347,331 B2
(45) Date of Patent: May 24, 2016

(54) ELECTRODYNAMIC CONTROL OF BLADE CLEARANCE LEAKAGE LOSS IN TURBOMACHINERY APPLICATIONS

(75) Inventor: Subrata Roy, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 765 days.

(21) Appl. No.: 12/664,317

(22) PCT Filed: Jun. 11, 2008

(86) PCT No.: PCT/US2008/066588
§ 371 (c)(1),
(2), (4) Date: Dec. 11, 2009

(87) PCT Pub. No.: WO2008/154592
PCT Pub. Date: Dec. 18, 2008

(65) Prior Publication Data
US 2010/0183424 A1      Jul. 22, 2010

Related U.S. Application Data

(60) Provisional application No. 60/943,099, filed on Jun. 11, 2007.

(51) Int. Cl.
*F01D 11/10*    (2006.01)
*F01D 5/20*    (2006.01)

(52) U.S. Cl.
CPC ................. *F01D 11/10* (2013.01); *F01D 5/20* (2013.01); *F05D 2270/172* (2013.01); *Y02T 50/673* (2013.01)

(58) Field of Classification Search
CPC ......... F01D 11/10; F01D 5/20; F04D 29/687; F05D 2270/172
USPC ................. 416/174; 415/173.1, 170.1, 173.2, 415/173.6, 175
See application file for complete search history.

(56) References Cited

U.S. PATENT DOCUMENTS 4,847,556 A * 7/1989 Langley .................. 324/207.18
4,971,517 A   11/1990 Perkey et al.
(Continued)

FOREIGN PATENT DOCUMENTS

| JP | 06-087010 | 11/1994 |
|---|---|---|
| WO | WO 2005-114013 | 12/2005 |
| WO | WO 2005114013 A1 * | 12/2005 |

OTHER PUBLICATIONS

Van Ness, et al; Turbine Tip Clearance Control using Plasma Actuators, Jan. 2006.*

(Continued)

*Primary Examiner* — Christopher Verdier
*Assistant Examiner* — Adam W Brown
(74) *Attorney, Agent, or Firm* — Saliwanchik, Lloyd & Eisenschenk (57) ABSTRACT

Electrodynamic control of fluid leakage loss is provided. Embodiments utilize electrohydrodynamic (EHD) principles to control and/or reduce leakage flow in turbomachinery. Electrodes can be used to provide a flow actuation mechanism inside the clearance gap for generating discharge. The electrodes can be positioned to have geometric asymmetry. Embodiments provide the electrodes on a turbine blade. The blade can have a DC power that can function as a square pulsed DC wave with the duty cycle equal to the blade passing frequency and the stator can be grounded. In an embodiment, the stator can have the actuator of the electrode-insulator assembly attached to the inside. In one embodiment, the actuators can be arranged just on the stator or casing. The phase and power supply to individual electrodes can be adapted as needed. In one embodiment, the phase can be lagged for accurate control of leakage flow. The control of the power supply to the electrodes can involve a closed control loop that monitors tip gap size.

37 Claims, 2 Drawing Sheets

(56) References Cited

U.S. PATENT DOCUMENTS

| | | | |
|---|---|---|---|
| 7,624,941 B1 * | 12/2009 | Patel et al. | 244/3.22 |
| 7,736,123 B2 * | 6/2010 | Lee et al. | 415/1 |
| 7,819,626 B2 * | 10/2010 | Lee et al. | 415/173.2 |
| 2002/0060432 A1 | 5/2002 | Webster | |
| 2006/0005545 A1 * | 1/2006 | Samimy et al. | 60/772 |

OTHER PUBLICATIONS

Post, M., et al., "Flow Control with Single Dielectric Barrier Plasma Actuators," *AIAA*, 2005-4630.

Van Ness II, D., et al., "Turbine Tip Clearance Flow Control using Plasma Actuators," *AIAA*, 2006-0021.

* cited by examiner

ELECTRODYNAMIC CONTROL OF BLADE CLEARANCE LEAKAGE LOSS IN TURBOMACHINERY APPLICATIONS

CROSS-REFERENCE TO RELATED APPLICATIONS

The present application is the U.S. National Stage Application of International Patent Application No. PCT/US2008/066588, filed on Jun. 11, 2008, which claims the benefit of U.S. Provisional Application Ser. No. 60/943,099, filed Jun. 11, 2007, both of which is are hereby incorporated by reference herein in its-their entirety, including any figures, tables, or drawings.

BACKGROUND OF INVENTION

In general, a turbine engine extracts energy from fluid flow. The fluid may be gas, steam, or liquid. One interest in turbine design is to provide high efficiency for energy generation. A turbine typically experiences efficiency loss due to fluid leakage through a clearance gap between a turbine blade and a casing wall in a turbine stage. This gap between the turbine blade tip and the casing is often referred to as a tip gap. The tip gap allows for the blade's mechanical and thermal growth, but the tip gap leakage flow results in a reduction in the work done by the blade and, therefore, the efficiency of the turbine.

Some approaches to improving the turbine efficiency include reducing the tip gap, implementing a more effective tip leakage sealing mechanism, or incorporating passive or active flow control devices. A recent approach to improve efficiency is described in the paper, "Turbine Tip Clearance Flow Control using Plasma Actuators," by Van Ness II et al. (2006). Van Ness II et al. describes an active flow control device that uses a plasma actuator made up of two metal electrodes separated by a dielectric material mounted on a blade tip The electrodes are formed on the rotor in a single arrangement where EHD principles are used to provide active control of tip clearance flow.

Accordingly, improving turbine efficiency and reducing loss due to tip gap leakage flow is of interest.

BRIEF SUMMARY

Embodiments of the subject invention utilize electrohydrodynamic (EHD) effects to control and/or reduce leakage flow in turbomachinery applications. Tip flow control schemes can incorporate electrodes to provide a mechanism for flow actuation inside the clearance gap for generating discharge. The electrodes can be positioned to have geometric asymmetry. A first electrode can be exposed to the gap between the blade, or rotor, and the stator, or casing, and the second electrode can be embedded in, or positioned on the other side of, a layer of insulator, such as a dielectric, where the second electrode is displaced a short distance from the first electrode along the direction of the leakage flow. Embodiments provide electrodes on a turbine blade and/or on a tip of a turbine blade. The blade can be supplied with DC power that can function as a square pulsed DC wave with the duty cycle equal to the blade passing frequency and the stator can be grounded.

An ac voltage, such as an RF voltage, can be applied to the electrode exposed to the gap and the electrode displaced from the electrode exposed to the gap can be grounded. If desired, a coating can be applied to the electrode exposed to the gap. The electric field generated by the discharge is due to the geometric asymmetry as well as the vastly disparate mobility of the electrons and ions.

The plasma at this pressure is highly collisional, causing an efficient energy exchange between charged and neutral species. The net forces generated by the intermittent discharge induce ion-"wind," while ion-neutral collision transfer mechanisms generate the desired surface wall-jet-like effect. The response of the fluid to these forces can include some charged and neutral species interaction past complex configurations under conditions where transition and turbulence are dominant.

In an embodiment, the stator can have the actuator of the electrode-insulator assembly attached to the inside. In one embodiment, the actuators of embodiments of the present invention can be arranged just on the stator or casing. The phase and power supplied to individual electrodes can be adapted as needed. In one embodiment, the phase can be lagged for accurate control of leakage flow. The control of the power supply to the electrodes can involve a closed control loop that monitors tip gap size. In a further embodiment, rotation of the rotor in an imposed magnetic field can be used for supplying power for electrohydrodynamic (EHD) operation. In such an embodiment, magnets can be embedded in the rotor.

BRIEF DESCRIPTION OF DRAWINGS

FIG. 2A shows the effect of leakage mass flow rate on gap height, and FIG. 2B shows the effect of leakage mass flow rate on efficiency.

DETAILED DISCLOSURE

Embodiments of the subject invention utilize electrohydrodynamic (EHD) effects to control and/or reduce leakage flow in turbomachinery applications. In specific embodiments, electrohydrodynamic effects are used to control leakage flow through gas turbine tips. Additional embodiments can control leakage flow through compressors or diffuser vanes, where diffuser vanes guide flow via quasi-static blades. Embodiments of the invention can be incorporated with high and low pressure turbines. Embodiments of the present invention can be useful as devices for use in power generation and the aircraft industry. In addition, embodiments providing a non-contact way to control leakage loss may be useful in many areas. Embodiments can also be utilized for controlling flow energy losses in diffusers.

Figure 1:
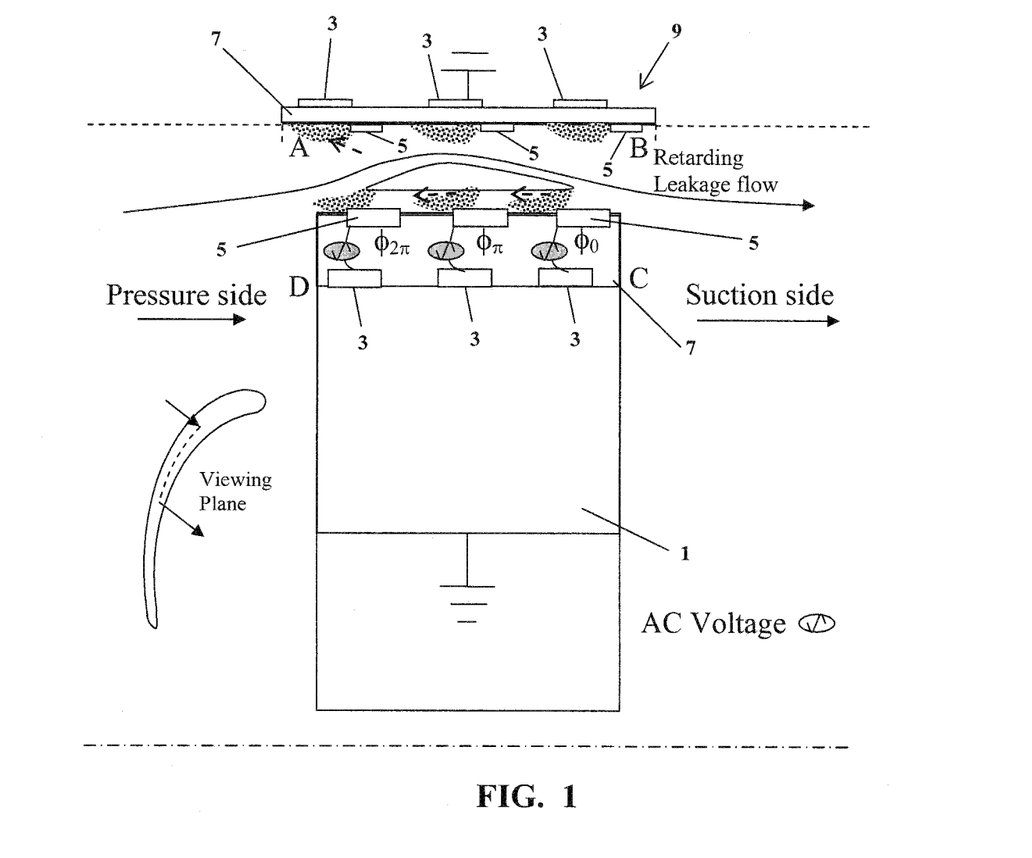
FIG. 1 shows a schematic of electrohydrodynamic (EHD) flow actuation near a turbine blade tip blade according to an embodiment of the present invention.

A schematic for the electrohydrodynamic flow about the turbine tip in accordance with an embodiment is shown in FIG. 1, showing blade tip electrodes and illustrating a flow actuation mechanism inside the clearance. The turbine blade 1 rotates in a vertical plane that is perpendicular to the plane of the page such that the turbine blade is coming out of the page. A cross-sectional view of the blade is shown on the left side of FIG. 1, with the viewing plane shown in dotted line. Ground electrodes 3 and AC powered electrodes 5 can be offset with a dielectric material 7 separating the electrodes, as shown. Fluid leaks from the pressure side to the suction side. The region is at high pressure so collision will dominate the ionized gas. The electric field generated by the discharge is a consequence of this geometric asymmetry as well as the vastly disparate mobility of the electrons and ions. The net forces generated by the intermittent discharge induced ion-wind, while ion-neutral collision transfer mechanisms generate the desired surface wall-jet-like effect. The demarked region ABCD can be simulated with the dielectric using EHD equations for various design configurations of electrodes and power supply. The phase supply to individual electrodes may be lagged for accurate control of leakage flow.

The electric field distributions derived from different configurations can be imposed in the Glenn-HT turbulent gas flow simulation as body forces for accurate determination of its effect on tip flow. The grid for Glenn-HT simulation can identify the location of exposed electrodes on the aerodynamic blade surface and not include the dielectric.

Examples of how the electric power can be applied include the following:

1. The blade can have a dc power that can act like a square pulsed dc wave with the duty cycle equal to the blade passing frequency. The stator 9 can be grounded.

2. The stator 9 can have the actuator (electrode-insulator assembly) attached to the inside so that effect can be realized by the tip clearance flow.

The blade passing frequency can be frequency that a blade passes a certain position on the stator, or casing, which can be the rotation frequency of the rotor times the number of the blades. The stator or casing 9 shown in FIG. 1 can be a grounded casing, but does not have to be grounded or can be the stator, which can optionally be grounded.

The collision frequencies may be high (~$10^6$/s) at the blade tip due to high gas pressure. This will allow ion-neutral momentum transfer at very small time scales (~µs). Thus, the actuation response will be fast. However, due to a strong E field near the blade tip, the ion drift (Bohm) velocity inside the space charge plasma will be of the order $5 \times 10^3$ m/s while the induced gas velocity is only ~10 m/s. Hence, the Joule heating effect will be much larger than the viscous dissipation. This will produce a thermal jet pushing the gas from the tip upward, which in turn will help increase the size of the bubble (see the arrow at the central region of the tip in FIG. 1).

In an embodiment, a magnetic field B can be applied in the direction normal to the leakage flow or in a direction having a component normal to the leakage flow. In this way, the magnetic field can create a Lorentz force that opposes the leakage flow or redirects the leakage flow. The electric field from the electrodes and the applied magnetic field can work together to redirect, or impede, the leakage flow. In a specific embodiment, such a magnetic field can be created via embedded magnets. The magnetic field can help confine electrons in a directed drift and, thus, facilitating impact ionization. The magnetic field can also enable the use of additional ponderomotive forces $\nabla B^2/2\eta$, which can be extracted from the magnetic field. The latter may be useful to control the high leakage speed at the blade tip pressure/temperature condition. The effect of electromagnetic field on the gas velocity $V_n$ can be evaluated as:

$$\frac{dV_n}{dt} = (-\nabla p + e(n_i - n_e)E + j \times B)/m_n n_n + \eta \Delta V_n$$

where $j=e(n_i V_i - n_e V_e)$ is the electric current density and $\eta$ is the kinematic gas viscosity.

The imposed magnetic field B can be selected in order to maximize its effect on the electric field and, hence, the flow. The magnetic field near the wall (insulated or charged) can provide a near wall phenomena and help in flow actuation. In addition, the magnetic dynamo effect can be useful for AC power source inside this turbine blade arrangement.

Information regarding the variable space, or tip gap, in real time can be used to determine what level of electric power to provide to the electrodes to allow adaptive control of the leakage flow in the various operating regimes of the turbine. A closed control loop involving monitoring of the tip gap size can be used to provide such information. In an embodiment, power to operate the EHD device may be generated using the rotation of the rotor, or blade, in an imposed magnetic field. Embedded magnets may also be used for this purpose. Magnets can be placed away from the electrodes such that the magnetic fields cross the electric field lines, such as placing magnets on the stator, or casing, with the electrodes on the blade, or placing magnets on the blades with the electrodes on the stator, or casing.

Embodiments of the invention can be useful in aviation, protecting local air quality. Reduction in tip leakage can increase engine efficiency. The use of EHD actuation may render the use of complex shroud geometrical changes unnecessary. Embodiments can be used in flow codes such as those used to design turbomachinery and other systems that employ EHD actuation for flow control to reduce losses, such as in tip clearance flows and separated flows, e.g., with diffuser vanes.

Figure 2A:
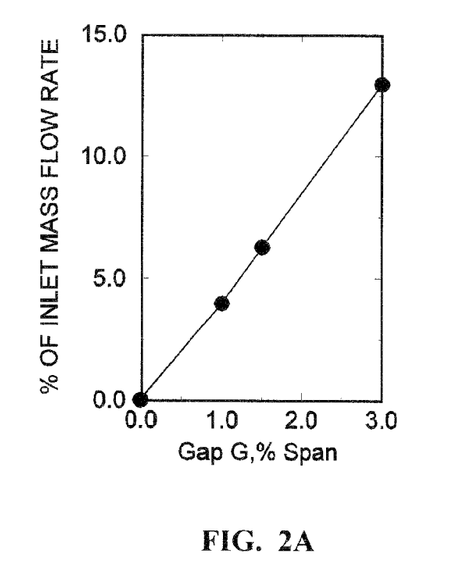
FIGS. 2A and 2B show leakage rate and efficiency vs. tip clearance height from "Heat Transfer and Flow on the First-Stage Blade Tip of a Power Generation Gas Turbine" Ameri et al., J. Turbomach. 122, 263-277 (2000), where
Figure 2B:
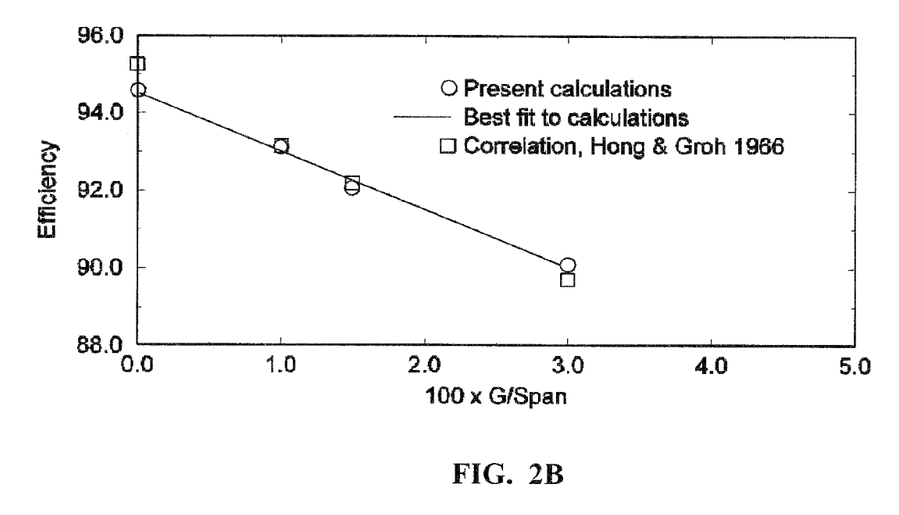

The leakage flow is the part of the flow that is unavailable to do work and, thus, is undesirable. Computed tip leakage flow rate for a typical advanced gas turbine rotor blade (the GE, $E^3$ blade, Halila et al., 1982 and Timko et al. (1982)) is presented in FIG. 2A. FIG. 2A shows that the tip leakage is a linear function of tip clearance height. This agrees with the measurements of Bindon (1989). The variation of stage efficiency with gap height can be calculated and compared to the available data or correlations in the literature. FIG. 2B shows the effect of height of the tip clearance gap on the adiabatic efficiency. The calculations were performed for the case of no tip clearance as well as 1, 1.5, and 3% tip clearance cases. The solid line is a best fit to the calculations. The variation of efficiency with gap height is seen to be linear with a slope of ~1.5 point per percent gap clearance. Both the linearity and the magnitude of the slope agree with the general rule of thumb exercised by designers. The open symbols are calculated from a graphic correlation put forth by Hong and Groh (1966) as reproduced in NASA SP-290 edited by Glassman (1994). The graphical correlation expresses the efficiency as a fraction of efficiency with no clearance. The efficiencies calculated suggest that the losses associated with the tip clearance are approximately 20, 30, and 45 percent of the total losses for the case of 1%, 1.5%, and 3% clearance, respectively. The tip clearance percentage can be defined as the leakage flow over the total flow, such that for the same physical dimensioned gap, embodiments of the subject invention can reduce the tip clearance percentage. This seems to confirm that measures taken to reduce the losses due to tip leakage can have a significant effect on the total losses. It also shows the effect that tip burning and widening of the gap might have on efficiency. FIGS. 2A and 2B also illustrate the ability of computational fluid dynamics (CFD) to not only provide accurate trends, but also absolute values of the efficiency. This makes a very good case for practical use of CFD in prediction of flow and heat transfer associated with tip leakage flow.

Referring to FIG. 1, the turbine blade moves fluid from the right to the left. The EHD flow actuation near the turbine blade tip creates a clockwise recirculating flow shown as the flat closed curve just above the blade tip and below the long curve showing the leakage flow from the pressure side to the suction side. Although FIG. 1 shows electrode pairs on both the grounded casing and the blade tip, embodiments can incorporate electrode pairs on just the blade tip, just the grounded casing, or both. Further, although FIG. 1 shows a clockwise recirculating flow shown as the flat closed curve just above the blade tip, the electrodes on the stator, or casing, when an appropriate voltage is applied can create a clockwise recirculating flow just below the stator, or casing. In a specific embodiment, one electrode of the electrode pair can be located on the blade tip and the ground electrode can be located on the casing. In such an embodiment, the duty cycle is driven by spacing of the grounded electrodes so that the pulse is provided when the electrode pair is properly positioned. The discharge from the electrode pairs on the grounded casing pushes the fluid in the leakage flow to the left in FIG. 1 and the discharge from the electrode pairs on the blade tip also pushes the fluid in the leakage flow to the left in FIG. 1, where the pushing effect extends out some distance from the surface of the casing and surface of the blade tip, respectively.

In additional embodiments, multiple layers of electrodes and dielectric layers can be utilized so that the discharge pushes against the leakage flow. Specific embodiments may have the discharge push in other directions so that the combination of the discharge flows impede the leakage flow.

As discussed above a magnetic field can be provided. In an embodiment permanent magnets can be embedded in the rotor (turbine blade) so that the E×B (Lorentz) force traps the fluid by pushing the fluid parallel to the plane of the turbine blade's rotation. Referring to FIG. 1, this would be accomplished with a B field up or down or into or out of the page.

The subject application can be applied to turbomachinery where blades drive fluid such as air or where a fluid such as air drives blades.

When monitoring the clearance gap, the amount of power to the electrode pairs can be controlled based on the gap size. For example, less power can be used with a smaller gap size to save power.

The electrode pairs can be powered with ac, such as RF, and/or DC pulses. The DC pulses can have a duty cycle of the passing blade. In a specific embodiment, the electrode pair or pairs can be positioned on the stator, or casing, and the voltage can be driven at the blade passing frequency or a harmonic thereof, such that the voltage is applied when the gap between the blade and the stator, or casing, is created and not applied when the gap does not exist because no blade is adjacent the stator, or casing. Of course, the voltage can be applied continuously, but would be less efficient. In a further embodiment, the electrode pair or pairs can be positioned in the blade tip, such that the voltage can be applied a portion or, preferably, all of the time. In a still further embodiment, one electrode can be positioned on the blade tip and the other electrode of the electrode pair can be positioned on the stator, or casing, such that the voltage can again be applied continuously, but preferably applied at the blade passing frequency or a harmonic thereof. Of course, combinations of these three embodiments can also be implemented. The ac can be turned on and off when, for example, the ac frequency is higher than the duty cycle of the passing blade. When the ac frequency is lower than the passing blade frequency, then the ac frequency can be the duty cycle. When applying a DC voltage, the DC voltage can be pulsed at the passing blade frequency.

The subject invention can be applied to any fluids that can be ionized, such as air, gases, and liquids. For electrically non-conductive fluids, the electrode of the electrode pair near the surface can be exposed to the air, but a cover can be positioned over the electrode if desired. For electrically conductive fluids, a cover, such as dielectric coating, can be placed over the electrode near the surface. This cover can improve safety.

In specific embodiments, the dielectric constant of the dielectric material between electrodes of an electrode pair is higher than the dielectric constant of the fluid. In a further specific embodiment, the dielectric constant of the dielectric material is at least double that of the fluid.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. An apparatus, comprising:
   a plurality of blades;
   a casing, wherein:
   (i) a fluid flowing from a high pressure side of the plurality of blades to a low pressure side of the plurality of blades in a direction of flow is incident on the plurality of blades and causes the plurality of blades to rotate about a longitudinal axis of the apparatus, or
   (ii) a fluid is caused to flow from a low pressure side of the plurality of blades to a high pressure side of the plurality of blades in a direction of flow when the plurality of blades is rotated about the longitudinal axis of the apparatus,
   wherein when the plurality of blades rotates about the longitudinal axis of the apparatus the plurality of blades moves relative to the casing such that there is a gap between each blade of the plurality of blades and the casing and a leakage flow of the fluid flows in the gap in a leakage flow direction,
   wherein the leakage flow direction is from the high pressure side of the plurality of blades to the low pressure side of the plurality of blades;
   a voltage source; and
   at least one electrode pair,
   wherein the at least one electrode pair comprises a corresponding at least one blade electrode and a corresponding at least one casing electrode,
   wherein the at least one blade electrode is on a first blade of the plurality of blades and the at least one casing electrode is on the casing,
   wherein each casing electrode of the at least one casing electrode is offset in the leakage flow direction or offset in a direction opposite to the leakage flow direction from the corresponding blade electrode of the at least one blade electrode,
   wherein the voltage source applies a corresponding at least one voltage across the at least one electrode pair,
   wherein application of the at least one voltage across the corresponding at least one electrode pair creates a corresponding at least one plasma and causes a corresponding at least one electrohydrodynamic effect that pushes the fluid in the leakage flow of fluid flowing in the gap so as to reduce the leakage flow of the fluid.

2. The apparatus according to claim 1, wherein the at least one voltage is at least one pulsed voltage, wherein each pulsed voltage of the at least one pulsed voltage is pulsed at a blade passing frequency or a harmonic of the blade passing frequency.

3. The apparatus according to claim 2, wherein the apparatus is a turbine.

4. The apparatus according to claim 2, wherein the apparatus is a compressor.

5. The apparatus according to claim 2, wherein the apparatus is a diffuser.

6. The apparatus according to claim 2, wherein one or more of the at least one blade electrode is on a tip surface of the first blade.

7. The apparatus according to claim 2, wherein each of the at least one pulsed voltage is an ac voltage.

8. The apparatus according to claim 2, wherein each of the at least one pulsed voltage is a dc voltage.

9. The apparatus according to claim 2, wherein the plurality of blades is n blades, where n is an integer and n>1, wherein the blade passing frequency is a rotation frequency of the plurality of blades about the longitudinal axis multiplied by n.

10. The apparatus according to claim 1, wherein the corresponding at least one electrohydrodynamic effect pushes the fluid in the leakage flow of fluid flowing in the gap in a direction having a component opposite to the leakage flow direction.

11. The apparatus according to claim 1, wherein the at least one voltage is at least one pulsed voltage.

12. The apparatus according to claim 1,
wherein the voltage source applies a first voltage of the at least one voltage across a first electrode pair of the at least one electrode pair,
wherein application of the first voltage across the first electrode pair creates a corresponding first plasma and causes a corresponding electrohydrodynamic effect that pushes the fluid in the leakage flow of fluid flowing in the gap so as to reduce the leakage flow of the fluid.

13. An apparatus, comprising:
a plurality of blades;
a casing, wherein:
(i) a fluid flowing from a high pressure side of the plurality of blades to a low pressure side of the plurality of blades in a direction of flow is incident on the plurality of blades and causes the plurality of blades to rotate about a longitudinal axis of the apparatus, or
(ii) a fluid is caused to flow from a low pressure side of the plurality of blades to a high pressure side of the plurality of blades in a direction of flow when the plurality of blades is rotated about the longitudinal axis of the apparatus,
wherein when the plurality of blades rotates about the longitudinal axis of the apparatus the plurality of blades moves relative to the casing such that there is a gap between each blade of the plurality of blades and the casing and a leakage flow of the fluid flows in the gap in a leakage flow direction,
wherein the leakage flow direction is from the high pressure side of the plurality of blades to the low pressure side of the plurality of blades;
a voltage source; and
at least one electrode pair,
wherein the voltage source applies a corresponding at least one voltage across the at least one electrode pair,
wherein application of the at least one voltage across the at least one electrode pair creates a corresponding at least one plasma and causes a corresponding at least one electrohydrodynamic effect that pushes the fluid in the leakage flow of fluid flowing in the gap and reduces the leakage flow of the fluid,
wherein the at least one electrode pair is located on the casing,
wherein each electrode pair of the at least one electrode pair comprises:
a first electrode of each electrode pair of the at least one electrode pair positioned proximate an inner surface of the casing, and a second electrode of each electrode pair of the at least one electrode pair offset in the leakage flow direction or offset in a direction opposite to the leakage flow direction from the corresponding first electrode of the corresponding electrode pair of the at least one electrode pair and separated from the corresponding first electrode by a dielectric,
wherein the at least one electrode pair comprises three electrode pairs,
wherein the electrode pairs of the three electrode pairs are offset from each other in an offset direction, wherein the offset direction is in the direction opposite to the leakage flow direction or in the same direction as the leakage flow direction,
wherein three voltage phases of a corresponding three voltages of the at least one voltage applied across the three electrode pairs of the at least one electrode pair are lagged with respect to each other.

14. An apparatus, comprising:
a plurality of blades;
a casing, wherein:
(i) a fluid flowing from a high pressure side of the plurality of blades to a low pressure side of the plurality of blades in a direction of flow is incident on the plurality of blades and causes the plurality of blades to rotate about a longitudinal axis of the apparatus, or
(ii) a fluid is caused to flow from a low pressure side of the plurality of blades to a high pressure side of the plurality of blades in a direction of flow when the plurality of blades is rotated about the longitudinal axis of the apparatus,
wherein when the plurality of blades rotates about the longitudinal axis of the apparatus the plurality of blades moves relative to the casing such that there is a gap between each blade of the plurality of blades and the casing and a leakage flow of the fluid flows in the gap in a leakage flow direction,
wherein the leakage flow direction is from the high pressure side of the plurality of blades to the low pressure side of the plurality of blades;
a voltage source; and
at least one electrode pair, wherein the voltage source applies a corresponding at least one pulsed voltage across the at least one electrode pair,
wherein application of the at least one pulsed voltage across the at least one electrode pair creates a corresponding at least one plasma and causes a corresponding at least one electrohydrodynamic effect that pushes the fluid in the leakage flow of fluid flowing in the gap so as to reduce leakage flow of the fluid,
wherein each electrode pair of the at least one electrode pair is located on the casing,
wherein the at least one electrode pair comprises:
a first electrode of each electrode pair of the at least one electrode pair positioned proximate an inner surface of the casing, and a second electrode of each electrode pair of the at least one electrode pair offset in the leakage flow direction or offset in a direction opposite to the leakage flow direction from the corresponding first electrode of the corresponding electrode pair of the at least one electrode pair and separated from the corresponding first electrode by a dielectric, wherein each of the at least one pulsed voltage is pulsed at the blade passing frequency or a harmonic of the blade passing frequency.

15. The apparatus according to claim 14, wherein each of the at least one pulsed voltage is an ac voltage.

16. The apparatus according to claim 14, wherein each of the at least one pulsed voltage is a dc voltage.

17. The apparatus according to claim 14, wherein the plurality of blades is n blades, where n is an integer and n>1, wherein the blade passing frequency is a rotation frequency of the plurality of blades about the longitudinal axis multiplied by n.

18. An apparatus comprising:
a plurality of blades;
a casing, wherein:
(i) a fluid flowing from a high pressure side of the plurality of blades to a low pressure side of the plurality of blades in a direction of flow is incident on the plurality of blades and causes the plurality of blades to rotate about a longitudinal axis of the apparatus, or
(ii) a fluid is caused to flow from a low pressure side of the plurality of blades to a high pressure side of the plurality of blades in a direction of flow when the plurality of blades is rotated about the longitudinal axis of the apparatus,
wherein when the plurality of blades rotates about the longitudinal axis of the apparatus the plurality of blades moves relative to the casing such that there is a gap between each blade of the plurality of blades and the casing and a leakage flow of the fluid flows in the gap in a leakage flow direction,
wherein the leakage flow direction is from the high pressure side of the plurality of blades to the low pressure side of the plurality of blades;
a voltage source; and
at least one electrode pair,
wherein the voltage source applies a corresponding at least one voltage across the at least one electrode pair,
wherein application of the at least one voltage across the at least one electrode pair creates a corresponding at least one plasma and causes a corresponding at least one electrohydrodynamic effect that pushes the fluid in the leakage flow of fluid flowing in the gap and reduces leakage flow of the fluid,
wherein each electrode pair of the at least one electrode pair comprises a first electrode of each electrode pair of the at least one electrode pair on a tip surface of one of the blades of the plurality of blades and a second electrode of each electrode pair of the at least one electrode pair on the tip surface of the one of the blades of the plurality of blades offset in a first offset direction from the first electrode and separated from the first electrode by a dielectric,
wherein the first offset direction is a direction opposite to the leakage flow direction or in the same direction as the leakage flow direction,
wherein the at least one electrode pair comprises three electrode pairs positioned on a first blade,
wherein the electrode pairs of the three electrode pairs are offset from each other in a second offset direction, where the second offset direction is in the direction opposite to the leakage flow direction or in the same direction as the leakage flow direction,
wherein three voltage phases of a corresponding three voltages of the at least one voltage applied across the three electrode pairs of the at last one electrode pair are lagged with respect to each other.

19. An apparatus comprising:
a plurality of blades;
a casing, wherein:
(i) a fluid flowing from a high pressure side of the plurality of blades to a low pressure side of the plurality of blades in a direction of flow is incident on the plurality of blades and causes the plurality of blades to rotate about a longitudinal axis of the apparatus, or
(ii) a fluid is caused to flow from a low pressure side of the plurality of blades to a high pressure side of the plurality of blades in a direction of flow when the plurality of blades is rotated about the longitudinal axis of the apparatus,
wherein when the plurality of blades rotates about the longitudinal axis of the apparatus the plurality of blades moves relative to the casing such that there is a gap between each blade of the plurality of blades and the casing and a leakage flow of the fluid flows in the gap in a leakage flow direction,
wherein the leakage flow direction is from the high pressure side of the plurality of blades to the low pressure side of the plurality of blades;
a voltage source; and
at least one electrode pair, wherein each electrode pair of the at least one electrode pair comprises a first electrode of each electrode pair of the at least one electrode pair and a second electrode of each electrode pair of the at least one electrode pair offset from the first electrode in the leakage flow direction or in a direction opposite to the leakage flow direction,
wherein the voltage source applies a corresponding at least one voltage across the at least one electrode pair,
wherein application of the at least one voltage across the at least one electrode pair creates a corresponding at least one plasma and causes a corresponding at least one electrohydrodynamic effect that pushes the fluid in the leakage flow of fluid flowing in the gap so as to reduce leakage flow of the fluid, wherein the voltage source applies a first voltage of the at least one voltage across a first electrode air of the at least one electrode pair,
wherein application of the first voltage across the first electrode pair creates a corresponding first plasma and causes a corresponding electrohydrodynamic effect that pushes the fluid in the leakage flow of fluid flowing in the gap so as to reduce the leakage flow of the fluid; and
at least one magnet positioned such that each magnetic field of a corresponding at least one magnetic field from the at least one magnet has a component normal to the direction of leakage flow such that the at least one magnetic field creates a corresponding at least one Lorentz force on the fluid in the leakage flow flowing in the gap and contributes to the reducing leakage flow of the fluid.

20. The apparatus according to claim 19, wherein the at least one magnet is embedded in the plurality of blades.

21. A method for reducing leakage flow loss in an apparatus, wherein the apparatus comprises:
a plurality of blades;
a casing, wherein:
(i) a fluid flowing from a high pressure side of the plurality of blades to a low pressure side of the plurality of blades in a direction of flow is incident on the plurality of blades and causes the plurality of blades to rotate about a longitudinal axis of the apparatus, or
(ii) a fluid is caused to flow from a low pressure side of the plurality of blades to a high pressure side of the plurality of blades in a direction of flow when the plurality of blades is rotated about the longitudinal axis of the apparatus, wherein when the plurality of blades rotates about the longitudinal axis of the apparatus the plurality of blades moves relative to the casing such that there is a gap between each blade of the plurality of blades and the casing and a leakage flow of the fluid flows in the gap in a leakage flow direction, wherein the leakage flow direction is from the high pressure side of the plurality of blades to the low pressure side of the plurality of blades; and at least one electrode pair, the method comprising:

applying a corresponding at least one pulsed voltage across the at least one electrode pair, wherein each electrode pair of the at least one electrode pair comprises a corresponding at least one blade electrode of the electrode pair of the at least one electrode pair and a corresponding at least one casing electrode of the electrode pair of the at least one electrode pair, wherein the at least one blade electrode is on a first blade of the plurality of blades and the at least one casing electrode is on the casing, wherein each casing electrode of the at least one casing electrode is offset in the leakage flow direction or offset in a direction opposite to the leakage flow direction from the corresponding blade electrode of the at least one blade electrode, wherein the application of the at least one pulsed voltage across the at least one electrode pair creates a corresponding at least one plasma and causes a corresponding at least one electrohydrodynamic effect that pushes the fluid in the leakage flow of fluid flowing in the gap so as to reduce leakage flow of the fluid.

22. The method according to claim 21, wherein the apparatus is a turbine.

23. The method according to claim 21, wherein the apparatus is a compressor.

24. The method according to claim 21, wherein the apparatus is a diffuser.

25. The method according to claim 21, wherein one or more of the at least one blade electrode is on a tip surface of the first blade.

26. The method according to claim 21, wherein each of the at least one pulsed voltage is an ac voltage.

27. The method according to claim 21, wherein each of the at least one pulsed voltage is a dc voltage.

28. The method according to claim 21, wherein the at least one pulsed voltage is pulsed at a blade passing frequency or a harmonic of the blade passing frequency.

29. The method according to claim 21, wherein the plurality of blades has n blades, where n is an integer and n>1, wherein the blade passing frequency is a rotation frequency of the plurality of blades about the longitudinal axis multiplied by n.

30. A method for reducing leakage flow loss in an apparatus, wherein the apparatus comprises:

a plurality of blades;

a casing, wherein:

(i) a fluid flowing from a high pressure side of the plurality of blades to a low pressure side of the plurality of blades in a direction of flow is incident on the plurality of blades and causes the plurality of blades to rotate about a longitudinal axis of the apparatus, or (ii) a fluid is caused to flow from a low pressure side of the plurality of blades to a high pressure side of the plurality of blades in a direction of flow when the plurality of blades is rotated about the longitudinal axis of the apparatus, wherein when the plurality of blades rotates about the longitudinal axis of the apparatus the plurality of blades moves relative to the casing such that there is a gap between each blade of the plurality of blades and the casing and a leakage flow of the fluid flows in the gap in a leakage flow direction, wherein the leakage flow direction is from the high pressure side of the plurality of blades to the low pressure side of the plurality of blades; and at least one electrode pair, wherein the at least one electrode pair is located on the casing, wherein each electrode pair of the at least one electrode pair comprises:

a first electrode of each electrode pair of the at least one electrode pair positioned proximate an inner surface of the casing, and a second electrode of each electrode pair of the at least one electrode pair offset in the leakage flow direction or offset in a direction opposite to the leakage flow direction from the corresponding first electrode of the corresponding electrode pair of the at least one electrode pair and separated from the corresponding first electrode by a dielectric, the method comprising:

applying a corresponding at least one voltage across the at least one electrode pair, wherein the application of the at least one voltage across the at least one electrode pair creates a plasma and causes a corresponding at least one electrohydrodynamic effect that pushes the fluid in the leakage flow of fluid flowing in the gap so as to reduce leakage flow of the fluid, wherein the at least one electrode pair comprises three electrode pairs, wherein the electrode pairs of the three electrode pairs are offset from each other in an offset direction, where the offset direction is in the direction opposite the leakage flow direction or in the same direction as the leakage flow direction, wherein three voltage phases of a corresponding three voltages of the at least one voltage applied across the three electrode pairs of the at least one electrode pair are lagged with respect to each other.

31. A method for reducing leakage flow loss in an apparatus, wherein the apparatus comprises:

a plurality of blades;

a casing, wherein:

(i) a fluid flowing from a high pressure side of the plurality of blades to a low pressure side of the plurality of blades in a direction of flow is incident on the plurality of blades and causes the plurality of blades to rotate about a longitudinal axis of the apparatus, or (ii) a fluid is caused to flow from a low pressure side of the plurality of blades to a high pressure side of the plurality of blades in a direction of flow when the plurality of blades is rotated about the longitudinal axis of the apparatus, wherein when the plurality of blades rotates about the longitudinal axis of the apparatus the plurality of blades moves relative to the casing such that there is a gap between each blade of the plurality of blades and the casing and a leakage flow of the fluid flows in the gap in a leakage flow direction, wherein the leakage flow direction is from the high pressure side of the plurality of blades to the low pressure side of the plurality of blades; and at least one electrode pair, the method comprising:

applying a corresponding at least one pulsed voltage across at least one electrode pair, wherein the application of the at least one pulsed voltage across the at least one electrode pair creates a corresponding at least one plasma and causes a corresponding at least one electrohydrodynamic effect that pushes the fluid in the leakage flow of fluid flowing in the gap so as to reduce leakage flow of the fluid, wherein the at least one electrode pair is located on the casing, wherein each electrode pair of the at least one electrode pair comprises:

a first electrode of each electrode pair of the at least one electrode pair positioned proximate an inner surface of the casing, and a second electrode of each electrode pair of the at least one electrode pair offset in the leakage flow direction or offset in a direction opposite to the leakage flow direction from the corresponding first electrode of the corresponding electrode pair of the at least one electrode pair and separated from the corresponding first electrode by a dielectric, wherein each of the at least one pulsed voltage is pulsed at the blade passing frequency or a harmonic of the blade passing frequency.

32. The method according to claim 31, wherein each of the at least one voltage is an ac voltage.

33. The method according to claim 31, wherein each of the at least one voltage is a dc voltage.

34. The method according to claim 31, wherein the plurality of blades is n blades, where n is an integer and n>1, wherein the blade passing frequency is a rotation frequency of the plurality of blades about the longitudinal axis multiplied by n.

35. A method for reducing leakage flow loss in an apparatus, wherein the apparatus comprises:

a plurality of blades;

a casing, wherein:

(i) a fluid flowing from a high pressure side of the plurality of blades to a low pressure side of the plurality of blades in a direction of flow is incident on the plurality of blades and causes the plurality of blades to rotate about a longitudinal axis of the apparatus, or (ii) a fluid is caused to flow from a low pressure side of the plurality of blades to a high pressure side of the plurality of blades in a direction of flow when the plurality of blades is rotated about the longitudinal axis of the apparatus, wherein when the plurality of blades rotates about the longitudinal axis of the apparatus the plurality of blades moves relative to the casing such that there is a gap between each blade of the plurality of blades and the casing and a leakage flow of the fluid flows in the gap in a leakage flow direction, wherein the leakage flow direction is from the high pressure side of the plurality of blades to the low pressure side of the plurality of blades; and at least one electrode pair, wherein each electrode pair of the at least one electrode pair comprises a first electrode of each electrode pair of the at least one electrode pair on a tip surface of one of the blades of the plurality of blades and a second electrode of each electrode pair of the at least one electrode pair on the tip surface of the one of the blades of the plurality of blades offset in the leakage flow direction or offset in a direction opposite to the leakage flow direction from the first electrode and separated from the first electrode by a dielectric, wherein the at least one electrode pair comprises three electrode pairs, wherein the electrode pairs of the three electrode pairs are offset from each other in an offset direction, wherein the offset direction is in the direction opposite to the leakage flow direction or in the same direction as the leakage flow direction, the method comprising:

applying a corresponding at least one voltage across the at least one electrode pair, wherein the application of the at least one voltage across the at least one electrode pair creates a corresponding at least one plasma and causes a corresponding at least one electrohydrodynamic effect that pushes the fluid in the leakage flow of fluid flowing in the gap so as to reduce leakage flow of the fluid, wherein applying the at least one voltage across the at least one electrode pair comprises applying a corresponding three voltages of the at least one voltage across the three electrode pairs, wherein a corresponding three voltage phases of the three voltages applied across the three electrode pairs are lagged with respect to each other.

36. A method for reducing leakage flow loss in an apparatus, wherein the apparatus comprises:

a plurality of blades;

a casing, wherein:

(i) a fluid flowing from a high pressure side of the plurality of blades to a low pressure side of the plurality of blades in a direction of flow is incident on the plurality of blades and causes the plurality of blades to rotate about a longitudinal axis of the apparatus, or (ii) a fluid is caused to flow from a low pressure side of the plurality of blades to a high pressure side of the plurality of blades in a direction of flow when the plurality of blades is rotated about the longitudinal axis of the apparatus, wherein when the plurality of blades rotates about the longitudinal axis of the apparatus the plurality of blades moves relative to the casing such that there is a gap between each blade of the plurality of blades and the casing and a leakage flow of the fluid flows in the gap in a leakage flow direction, wherein the leakage flow direction is from the high pressure side of the plurality of blades to the low pressure side of the plurality of blades; and at least one electrode pair, wherein each electrode pair of the at least one electrode pair comprises a first electrode of each electrode pair of the at least one electrode pair and a second electrode of each electrode pair of the at least one electrode pair offset from the first electrode in the leakage flow direction or in a direction opposite to the leakage flow direction, the method comprising:

applying a corresponding at least one voltage across at least one electrode pair, wherein the application of the at least one voltage across the at least one electrode pair creates a corresponding at least one plasma and causes a corresponding at least one electrohydrodynamic effect that pushes the fluid in the leakage flow of fluid flowing in the gap so as to reduce leakage flow of the fluid, wherein the voltage source applies a first voltage of the at least one voltage across a first electrode pair of the at least one electrode pair, wherein application of the first voltage across the first electrode pair creates a corresponding first plasma and causes a corresponding electrohydrodynamic effect that pushes the fluid in the leakage flow of fluid flowing in the gap so as to reduce the leakage flow of the fluid; and positioning at least one magnet such that each magnetic field of a corresponding at least one magnetic field from the at least one magnet has a component normal to the direction of leakage flow such that the at least one magnetic field creates a corresponding at least one Lorentz force on the fluid in the leakage flow flowing in the gap and contributes to reducing leakage flow of the fluid.

37. The method according to claim 36, wherein the at least one magnet is embedded in the plurality of blades.

\* \* \* \* \*